G. VAN SICKLE.
Band Cutter.

No. 98,648. Patented Jan. 4, 1870.

Witnesses

Inventor
Garret Van Sickle,
by his Attorney

United States Patent Office.

GARRETT VAN SICKLE, OF SHORTERVILLE, ASSIGNOR TO HIMSELF AND WILLIAM H. VAN SICKLE, OF SPRINGPORT, NEW YORK.

Letters Patent No. 98,648, dated January 4, 1870.

IMPROVEMENT IN PITCHFORKS.

The Schedule referred to in these Letters Patent and making part of the same.

*To whom it may concern:*

Be it known that I, GARRETT VAN SICKLE, of Shorterville, in the county of Ontario, and State of New York, have invented certain new and useful Improvements in Pitchforks and other like forks; and I hereby declare the following to be a full, clear, and exact description of the same, reference being had to the accompanying drawings, in which—

Figure 1:
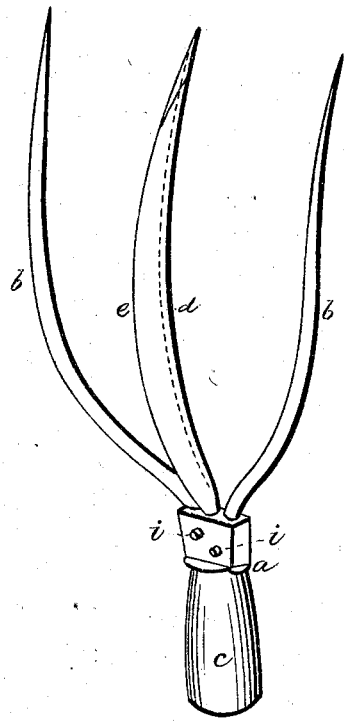
Figure 1 is a view, in perspective, of that portion of a fork to which my improvements are applied.
Figure 2:
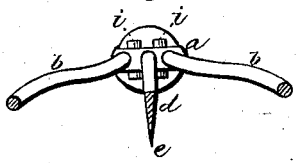
Figure 2 is a sectional view on the line *x y*, fig. 1.

The object of my invention is to combine, with a hay or grain-pitchfork, or other fork used for similar purposes, a device which is intended for cutting the bands of bundles of grain, or for any other purpose to which it may be applicable.

I have, however, contemplated using it more especially for cutting the bands of bundles of grain, preparatory to the threshing of the same.

By the ordinary mode, the person doing this work is compelled to stoop over and pick up each bundle and cut its band with a common knife, and then lay it down and use the pitchfork to feed it to the threshing-machine. Indeed, this operation sometimes requires the services of two laborers, one to cut the bands, and the other to pitch the bundles.

By my invention, much of this labor and delay is dispensed with, and one man can readily, without change of tool or instrument, cut the bands and feed the grain.

The invention may be stated to consist—

First, in attaching to the fork a knife or blade, placed so that it may be readily drawn across and sever the band or other article to be cut.

Second, in substituting, for one of the tines of the fork, a blade made as hereinafter described, so as to serve both as a knife to sever the bands, and a tine to act in conjunction with the others in taking up and pitching the bundles.

Third, in combining, with the fork, a removable knife, or combined knife and tine, which can be attached to the fork when its services are required, or replaced by an ordinary tine when it is no longer needed.

The nature of my invention will be readily understood by reference to the accompanying drawings.

*a* is the fork-head, constructed in any ordinary or suitable manner, having attached to it the tines *b*, and being provided with the socket *c* to receive the handle.

In this instance I have represented, as combined with the two outer tines *a*, a centre knife or blade, *d*, which is curved to conform with the tines, and has formed upon its outer, or convex side, the edge *e*, which projects beyond the plane of the two outer tines, so that it can be readily used for the purposes above stated.

The edge may be formed on the outer side of the blade *d*, or on the inner side, if found convenient, and the blade itself may be arranged in any suitable position upon the fork, and attached in any desired manner thereto; and the construction of the blade may also be varied in many respects, though I much prefer making it in the form represented, that is to say, drawn down at its outer end, so as to conform, in appearance, to the other tines, thus admirably fitting the fork both to cut the bands and pitch the bundles.

It may also be found convenient to make the cutting-tine *d* removable, so that it can be detached when its services are not needed, and replaced by a tine of ordinary construction.

This can be done by setting the shank of the tine in a suitable socket in the fork, and then keeping it in by means of pins *i*, as seen in the drawing, or any other means for the same purpose may be employed.

The manner in which the instrument is to be used is too obvious to need further description.

Having now described my invention, and the manner in which the same is or may be carried into effect,

What I claim, and desire to secure by Letters Patent, is—

1. The employment, with a pitchfork or other like fork, of a cutting-blade, applied to said fork, substantially as and for the purposes set forth.

2. The combination, with the fork, of a cutting-blade constructed substantially as described, so as to constitute both a knife to sever the bands, or other articles to be cut, and a tine to act in conjunction with the other tines of the fork.

In testimony whereof, I have signed my name to this specification, before two subscribing witnesses.

GARRETT VAN SICKLE.

Witnesses:
H. E. WOODRUFF,
WM. H. VAN SICKLE.